3,347,715
HEAT TREATMENT OF STEEL
Peter Charles Leslie Pfeil, Boar's Hill, near Oxford, England, assignor to United Kingdom Atomic Energy Authority, London, England
No Drawing. Filed Apr. 8, 1964, Ser. No. 358,380
Claims priority, application Great Britain, Apr. 10, 1963, 14,352/63
6 Claims. (Cl. 148—12)

The present invention relates to the treatment of metals and is particularly concerned with the treatment of austenitic stainless steels.

Stainless steel has a high corrosion resistance and it has been proposed to use such material in nuclear reactors, particularly in those reactors which operate at a high temperature, for example the reactor known as AGR, or which use a corrosive coolant such as superheated steam or liquid sodium, for example the reactors known as SGHW and PFR.

In addition to possessing high corrosion resistance, stainless steel is a comparatively ductile metal, this ductility being a particularly useful property if the steel is to be used for the fuel cans in a nuclear reactor since these cans are subjected to strain by internal or external pressure, by fuel expansion or by fuel swelling. This straining of the fuel can causes deformation under multi-axial stressing.

It has been found that after irradiation, chromium-nickel stainless steels lose part of their ductility at elevated temperatures, that is in excess of about 500° C. Since this loss of ductility is predominantly in the non-uniform part of the total elongation to fracture, it is clear that the deformation behaviour of the steel under multi-axial stressing is adversely affected. The reactors in which stainless steel is proposed for use are intended to be operated at temperatures in excess of 500° C., and thus this irradiation effect on the ductility of the steel is undesirable.

It is the object of the present invention to provide a method of improving the resistance of austenitic stainless steels to irradiation.

According to the present invention, there is provided a method of heat treating an austenitic stainless steel to reduce the tendency of said steel to undergo a reduction in high temperature ductility on irradiation which method comprises the steps of cold working the steel, annealing the cold-worked steel at a temperature in the range of 800–900° C., and repeating the cold working step and the annealing step at least once.

The temperature of the anneal should not exceed 900° C., and may conveniently be in the range 800–900° C. It will be realised that the time required for the anneal will be dependent on the temperature of the anneal, and it is considered that the optimum temperature range may be as high as 850–900° C., such a range partially combining the advantages of a low temperature anneal to produce a coarse precipitate and a high temperature anneal in giving a comparatively short time for the anneal.

Examination of a stainless steel which has been worked and then annealed in the conventional manner, i.e., annealed at a temperature of about 1050° C., shows that after irradiation a fine precipitate is formed at the grain boundaries. It is the production of this fine precipitate which, it is thought, causes the observed reduction in the ductility of the steel after irradiation.

The heat treatment of the present invention results in the induction and coarsening of a precipitate of the material which would otherwise be precipitated in a fine form on irradiation of the steel. It is found desirable that the annealing should be performed more than once, for example the steel may be annealed once between the last two stages of the working, and again at the end of working the metal. Conveniently, the first anneal may be short and the final anneal for a longer time. Examination of the steel after the first short anneal shows that precipitation has occurred at the grain boundaries and that the grain size is finer than before the anneal. After the second anneal, the precipitate is much coarser and no longer located at the grain boundaries, the grain size having decreased further to produce a very fine grain, this very fine grain being due to the working and annealing. It is also possible to give a final cold working stage after a suitable long, low temperature anneal. After irradiation of the specially treated steel, examination shows that very little fine precipitate is produced, the high temperature ductility of the steel being only very slightly affected by the irradiation.

In order that the present invention may more fully be understood, reference will now be made to the following examples which show the effect of the low temperature annealing on the properties of steel.

*Example I*

The steel used in this example was a vacuum-melted 20/25/Nb steel and on analysis was shown to have the following composition by weight, the remainder being iron:

|  | Percent |
| --- | --- |
| Carbon | 0.02 |
| Manganese | 0.78 |
| Silicon | 0.44 |
| Chromium | 21.2 |
| Nickel | 25.3 |
| Niobium | 0.65 |
| Nitrogen | 0.011 |

The steel was processed to strip 0.02 inch thick by cold rolling. The steel was annealed for four hours at 800° C. before the last stage of the cold working was performed, i.e., when its thickness was 0.028 inch. After the final cold rolling stage the steel was annealed at 800° C. for a further period of about 2½ days.

A sample of the treated steel was then placed in a nuclear reactor and exposed to a radiation dose of approximately $6 \times 10^{18}$ thermal neutrons/cm.$^2$, the temperature in the reactor being about 40° C.

Samples of steel of the same composition were cold rolled and annealed in the conventional manner, the temperatures of the two anneals being 1050° C., the treatment other being the same as with the specially treated steel. A sample of this conventionally treated steel was then irradiated in a nuclear reactor, the dose being approximately $6 \times 10^{18}$ fission neutrons/cm.$^2$.

Tensile tests were then carried out on the two irradiated samples and on the corresponding unirradiated samples and the elongation to failure at a strain rate of $2 \times 10^{-4}$ sec.$^{-1}$ was noted. The results are set out in Table I.

TABLE I

| Elongation at 750° C. | Sample annealed at 800° C. | Sample annealed at 1,050° C. |
| --- | --- | --- |
| Unirradiated | 48.7% | 44.6% |
| Irradiated | 48.5% | 29.8% |

Thus it will be clear that the process of annealing at 800° C. considerably increases the resistance to irradiation of the steel. It will also be noticed that the low temperature anneal has resulted in a slightly increased elongation (i.e., an increased ductility) in the unirradiated steel as compared with the elongation of the steel when annealed at 1050° C.

It is thought that the loss of ductility on irradiation is due to the precipitation of chromium or niobium carbide and possibly chromium or niobium nitride. The use of an annealing temperature of about 800° C. results in most of this material being precipitated during the annealing in a course form. An annealing temperature of 1050° C. produces no such precipitation and the material may then be precipitated in a fine form on irradiation with a consequent loss in ductility. It will be appreciated that the low temperature annealing will be effective in preventing a reduction in ductility on irradiation only if carried out for a time which is sufficient to cause the precipitation of most, if not all, of the materials which would otherwise be precipitated when the steel was subjected to irradiation.

*Example II*

Further specimens of 20/25/Nb steel, having approximately the same analysis as Example I were heat treated as in Example I and the heat treated specimens were then tested for tensile ductility at 750° C. at a strain rate of $2 \times 10^{-4}$ sec.$^{-1}$ after irradiation at 40° C. and the results are set out in Table II.

TABLE II

| Annealing temperature, ° C. | Dose, n/cm.$^2$ thermal | Elongation, percent |
|---|---|---|
| 800 | None | 66.1 |
| 1,050 | None | 56.7 |
| 800 | $1.2 \times 10^{19}$ | 71.8 |
| 1,050 | $1.2 \times 10^{19}$ | 43.3 |
| 800 | $7 \times 10^{19}$ | 74.5 |
| 1,050 | $7 \times 10^{19}$ | 47.5 |

*Example III*

The experiment of Example II was repeated, the tensile test being carried out at 650° C. at a strain rate of $5 \times 10^{-5}$ sec.$^{-1}$. The results are set out in Table III.

TABLE III

| Annealing temperature, ° C. | Dose, n/cm.$^2$ thermal | Elongation, percent |
|---|---|---|
| 800 | None | 59.8 |
| 1,050 | None | 46.0 |
| 800 | $7 \times 10^{19}$ | 56.8 |
| 10,050 | $7 \times 10^{19}$ | 34.3 |

*Example IV*

The creep facilities of steels treated in accordance with the invention as set out in Example I have also been tested in respect of 20/25/Nb steel irradiated to a dose of $1.2 \times 10^{19}$ n/cm.$^2$ thermal, with the results shown in Table IV.

TABLE IV

| Annealing temperature, ° C. | Stress (p.s.i.) | Minimum creep rate (hr. $^{-1}$) | Total strain |
|---|---|---|---|
| 800 | 25,000 | $3.2 \times 10^{-3}$ | 66.4 |
| 1,050 | 25,000 | $2.9 \times 10^{-3}$ | 21.4 |
| 800 | 18,000 | $6.1 \times 10^{-4}$ | 66.4 |
| 1,050 | 18,000 | $1.5 \times 10^{-4}$ | 8.2 |
| 800 | 15,000 | $2.3 \times 10^{-4}$ | 32.2 |
| 1,050 | 15,000 | $2.4 \times 10^{-5}$ | 5.7 |

*Example V*

Measurement of tensile ductility in air at 750° C. at a strain rate of $2 \times 10^{-4}$ sec.$^{-1}$ after irradiation at 80° C. to a dose of $1.5 \times 10^{20}$ n/cm.$^2$ thermal has been effected on type 316 stainless steel having the following composition by weight, the remainder being iron:

| | Percent |
|---|---|
| Carbon | 0.18 |
| Chromium | 16.8 |
| Nickel | 13.85 |
| Molybdenum | 2.64 |
| Manganese | 0.49 |
| Sulphur | 0.014 |
| Phosphorus | 0.013 |
| Silicon | 0.46 |
| Nitrogen | 0.0135 |
| Cobalt | 0.003 |
| Boron | 0.0002 |

This steel was cold rolled from 0.13 inch to 0.02 inch by 30% reductions with anneals at 800° C. Part was left in the cold-worked condition after the final reduction and part was annealed for 8 hours at 800° C. The results are set out in Table V.

TABLE V

| Condition | Dose, n/cm.$^2$ thermal | Elongation, percent |
|---|---|---|
| Cold worked | None | 52.7 |
| Annealed | None | 74.5 |
| Cold worked | $1.5 \times 10^{20}$ | 30.7 |
| Annealed | $1.5 \times 10^{20}$ | 47.5 |

*Example VI*

The sensitivity of steel to irradiation also depends to a large extent on its boron content and specifically on the boron-10 content. Thus a specimen of 20/20/Ti steel initially containing 1.4 p.p.m. boron had its boron content increased and examined for tensile ductility at 750° C. with a strain rate of $2 \times 10^{-4}$ sec.$^{-1}$. As indicated in the table, some of the specimens were treated in the manner set out in Example I. The results are set out in Table VI.

TABLE VI

| Pretreatment anneal temperature, ° C. | Boron content, p.p.m. | | | Dose, n/cm.$^2$ | Elongation, Percent |
|---|---|---|---|---|---|
| | $^{10}$B | $^{11}$B | Total | | |
| | 1.0 | 39.0 | 40.0 | None | 39.6 |
| | 36.4 | 3.6 | 40.0 | None | 37.3 |
| | 0.3 | 1.1 | 1.4 | None | 30.2 |
| | 1.0 | 39.0 | 40.0 | $5.5 \times 10^{17}$ | 29.7 |
| | 36.4 | 3.6 | 40.0 | $5.5 \times 10^{17}$ | 20.0 |
| | 0.3 | 1.1 | 1.4 | $5.5 \times 10^{17}$ | 20.3 |
| 800 | 1.0 | 39.0 | 40.0 | None | 66.9 |
| 800 | 36.4 | 3.6 | 40.0 | None | 69.4 |
| 800 | 1.0 | 39.0 | 40.0 | $5.5 \times 10^{17}$ | 64.5 |
| 800 | 36.4 | 3.6 | 40.0 | $5.5 \times 10^{17}$ | 48.5 |

In general the reduction in ductility on irradiation depends upon the total $^{10}$B$(n,\alpha)$Li$^7$ reactions, but the treatment in accordance with this invention reduces the total effect. Normal steel contains about 5 p.p.m. of natural boron and it is clear that a reduction in this figure or a reduction in the boron-10 content would be advantageous. The neutron absorption of such a boron content is negligible.

*Example VII*

In this example a sample of 20/25/Nb steel was hot rolled to 0.1 inch, annealed and cold rolled to .077 inch. It was then divided into two batches and both batches were cold rolled to 0.020 inch using 28% reductions with anneals between passes. For the first batch, all the anneals were at 1000° C. but for the second batch the anneals were, in order, ½ hour at 900° C., 1½ hours at 800° C.; 4 hours at 800° C. and 24 hours at 800° C. Samples of the cold work products were taken and subjected to final anneals of ½ hour at 1000° C. and 63 hours at 800° C. respectively. Cold-worked and annealed samples from each batch were irradiated at 650° C. to a dose of $6 \times 10^{20}$ n/cm.$^2$ (thermal). Ductility measurements were then carried out and it was found that, at 750° C. in air with a strain rate of $2 \times 10^{-4}$ sec.$^{-1}$, there was no essential difference in the ductilities of the cold worked and annealed specimens. However the specimens from the first batch had an elongation to fracture of only 6.4% whilst for the second batch the elongation was 15.8%.

I claim:

1. A method of heat treating an austenitic stainless steel to reduce the tendency of said steel to undergo a reduction in high temperature ductility on irradiation comprising the steps of cold working the steel, annealing the cold worked steel at a temperature in the range 800–900° C., and repeating said cold working step and said annealing step at least once.

2. The method of claim 1 wherein said cold working and said annealing steps are each performed twice, and the time of the second anneal is longer than the time of the first anneal.

3. The method of claim 2 wherein the annealing is effected at a temperature of about 800° C., the first anneal is effected for a period of about 4 hours and the second anneal for a period of about 60 hours.

4. The method of claim 1 wherein the final step in treating the steel is a cold working step.

5. The method of claim 1 wherein each anneal is effected for a longer period of time than the preceding anneal.

6. Austenitic stainless steel having a reduced tendency to undergo a reduction in high temperature ductility on irradiation produced by the process of claim 1.

References Cited

UNITED STATES PATENTS 3,199,978    8/1965    Brown et al. _____ 148—38 X

FOREIGN PATENTS 656,713    1/1963    Canada.
882,679    11/1963    Great Britain.

DAVID L. RECK, *Primary Examiner.*

H. F. SAITO, *Assistant Examiner.*